June 17, 1969

Z. TARCZY-HORNOCH 3,450,991

DIGITAL DIRECT READING HIGH FREQUENCY
MEASURING APPARATUS AND METHOD

Original Filed Aug. 24, 1964

INVENTOR.
Zoltan Tarczy-Hornoch
BY
Attorneys

United States Patent Office 3,450,991
Patented June 17, 1969

3,450,991
DIGITAL DIRECT READING HIGH FREQUENCY MEASURING APPARATUS AND METHOD
Zoltan Tarczy-Hornoch, Berkeley, Calif., assignor, by mesne assignments, to W. K. Rosenberry, doing business as Zeta Research, Lafayette, Calif.
Continuation of application Ser. No. 391,721, Aug. 24, 1964. This application June 5, 1967, Ser. No. 643,737
Int. Cl. G01v 23/14
U.S. Cl. 324—79    43 Claims

ABSTRACT OF THE DISCLOSURE

For an input signal with unknown $f_0$ frequency, a lower frequency $f_1$ signal is generated so that $$\frac{df_0}{df_1} = n$$

is an integer, a circuit receiving $f_0$ and $f_1$ obtains the value of $n$, and a digital frequency counter, with time base variable according to $n$, counts the frequency $f_1$ in such a manner that the reading becomes a direct digital representation of the frequency of the input signal.

CROSS REFERENCE TO RELATED APPLICATION

This application is a continuation of co-pending application Ser. No. 391,721 filed Aug. 24, 1964, now abandoned.

This invention relates to an apparatus and method for counting high frequencies and more particularly to an apparatus and method for counting high frequencies which makes it possible to give a direct digital readout of the measured frequency.

Conventional high frequency counting methods beyond the frequencies which can be resolved by individual trigger circuits are based on frequency mixing (difference frequency generating) techniques. Either a known and manually stepwise variable heterodyne frequency is added to the unknown frequency until the difference is within the resolution of conventional frequency counters, or a higher harmonic of a continuously variable frequency supplied by a manually tunable transfer oscillator is mixed with the unknown signal to produce a zero or a known difference frequency and then the transfer oscillator frequency is determined. In both cases, considerable skill and time is required to adjust the measuring apparatus accurately since it is easy to obtain incorrect readings. Furthermore an additional mental step or calculation is normally required to complete a frequency measurement. Therefore, there is a need for a new and improved apparatus and method for directly measuring high frequencies.

In general it is an object of the invention to provide an apparatus and method for measuring high frequencies which overcomes the above named disadvantages and in particular need not be based upon frequency mixing techniques.

Another object of the invention is to provide an apparatus and method of the above character in which frequency measurements can be made over a wide frequency range without range switching or tuning.

Another object of the invention is to provide an apparatus and method of the above character in which a direct readout can be obtained without human computation or interpretation.

Another object of the invention is to provide a method and apparatus of the above character by which frequencies can be measured without ambiguities.

Another object of the invention is to provide an apparatus of the above character which can be operated by relatively unskilled persons.

Another object of the invention is to provide an apparatus of the above character which is particularly adaptable for automatic or remote control operations.

Another object of the invention is to provide an apparatus of the above character which will automatically reset itself until a correct reading is obtained.

Another object of the invention is to provide an apparatus of the above character which is relatively simple to produce and maintain.

Another object of the invention is to provide an apparatus of the above character which is particularly adaptable for use such as microwave oscillator monitoring, controlling and stabilizing.

Additional objects and features of the invention will appear from the following description in which the preferred embodiments are set forth in detail in conjunction with the accompanying drawings.

Referring to the drawings.

In general, the apparatus for counting high frequencies consists of means of generating a repetitive waveform which can be called a short time base with its period being an integer or whole number greater than one times the period of the frequency being measured. Means is provided for determining the number of cycles of the input frequency within one period of the generated waveform. Means is also provided for determining the repetition rate of the generated waveform. Means is also provided for multiplying the number representing the repetition rate of the generated waveform by the number of cycles of the input frequency within the predetermined period of the generated waveform to give a direct reading of the frequency being measured.

Figure 1:
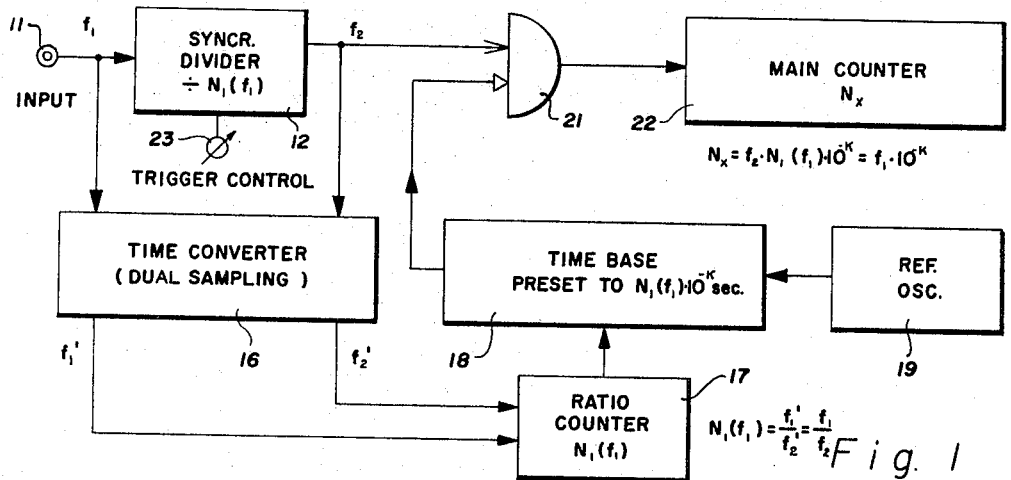
FIGURE 1 is a block diagram of an apparatus incorporating the present invention for performing the present method of high frequency counting.

Referring to the block diagram of FIGURE 1, the unknown input signal to be measured with frequency $f_1$ and a period of $T_1$ is fed to an input terminal 11 and into a synchronous divider 12. The synchronous divider 12 generates a repetitive short time base with a length or period which is an integer greater than one times the period $T_1$ of the input signal. This repetitive short time base has a frequency $f_2$ which is related to the frequency $f_1$ to be measured since its period is a multiple integer $N_1$ times the period T.

Figure 2:
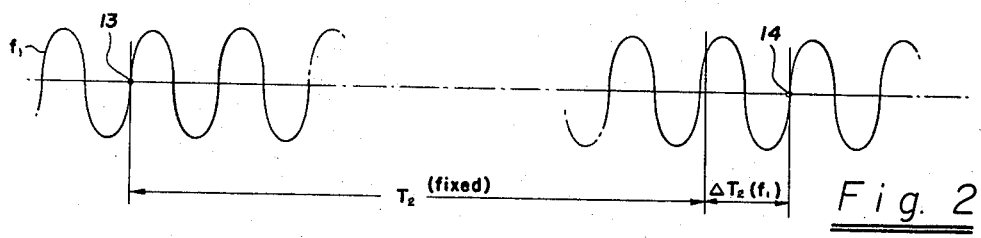
FIGURE 2 is a chart showing the relationship between the input waveform and the short time base which is generated in the apparatus shown in FIGURE 1.

This short time base or generated frequency $f_2$ is generated by the synchronous divider 12 by activating a trigger circuit (not shown) at a selected phase of the input waveform, such as the positive going zero crossing 13 as indicated in FIGURE 2, and then preventing the trigger circuit from triggering a second time for a predetermined fixed time $T_2$. After time $T_2$, the trigger circuit is made to trigger at the same phase as before i.e., positive going zero crossing 14. Therefore, the total length of the short time base will be $T_2 + \Delta T_2(f_1)$ where $\Delta T_2$ will vary if $f_1$ is changed. $\Delta T_2$ can be zero if $T_2$ happens to cover an integer number of cycles or periods of $f_1$. The repetition rate of the triggering will be $$f_2 = \frac{1}{T_2 + \Delta T_2(f_1)}$$

The integer number $$N_1(f_1) = \frac{T_2 + \Delta T_2(f_1)}{T_1} = \frac{f_1}{f_2}$$

will be a stepwise varying function of $f_1$. Circuits of this nature, although not used for the same purpose, are well known in the state of the art. They are also called analog divider or analog countdown circuits.

$N_1(f_1)$ itself is unknown, but can be determined if waveforms $f_1$ and $f_2$ are both fed into a dual channel converter 16 which will proportionally slow down both waveforms. Such a converter includes non-linear semiconductor means for providing a periodically changing impedance as seen by the input signal. The converter 16 can be of the type used in sampling oscilloscopes and identified as a dual channel sampling circuit. The time converter circuit will convert waveforms $f_1$ and $f_2$ to lower frequency waveforms $f_1'$ and $f_2'$ respectively, and the ratio of the two can be easily determined by feeding them into a conventional ratio counter 17. The counter 17 will be enabled for one period of $f_2'$ and will count the number of $f_1'$ cycles, that is, the unknown integer $$N_1(f_1) = \frac{f_1'}{f_2'} = \frac{f_1}{f_2}$$

The ratio so determined is fed into a presettable time base 18 so that it will generate a time interval $T = N_1(f_1) \times 10^{-k}$ second, where $k$ is a fixed integer which depends on the frequency of the reference oscillator 19 and the number of decimal counting units preceding the preset decades.

The output of the synchronous divider 12 with a frequency of $f_2$ and the output of the time base 18 are fed through gate 21 into a main counter 22. This counter will count $f_2$ cycles per second for a duration of $N_1(f_1) \times 10^{-k}$ seconds. Therefore, it will read $$N_x = f_2 \times N_1(f_1) \times 10^{-k} = \frac{f_1}{N_1(f_1)} \times N_1(f_1) \times 10^{-k} = f_1 \times 10^{-k}$$

This is the input frequency to be measured except for placement of a decimal point which can be inserted in a predetermined position into the main counter.

It should be noted that in the final step the ratio $N_1(f_1)$ is cancelled out. Therefore, if it is changing, not only because of changing of $f_1$ but due to circuit aging, temperature changes, voltage drifts, etc., it will not influence the accuracy of the reading as long as it remains constant for the duration of a single measurement, which typically requires only a fraction of a second. The operator who reads the output of the main counter only will not be normally aware of either the value or the change of $N_1(f_1)$. The only exception is when $T_2(f_1) \approx 0$ and $N_1(f_1)$ is alternating between two numbers. This will show up as an unsteady reading, and the operator merely has to readjust the trigger control 23 for the synchronous divider 12. This control 23 is able to change the predetermined $T_2$ slightly, for example, by changing a timing element such as capacitor, delay line or other circuit delay, or by adjusting the trigger level of the synchronous divider. This adjustment can also be made automatically as hereinafter described.

Figure 3:
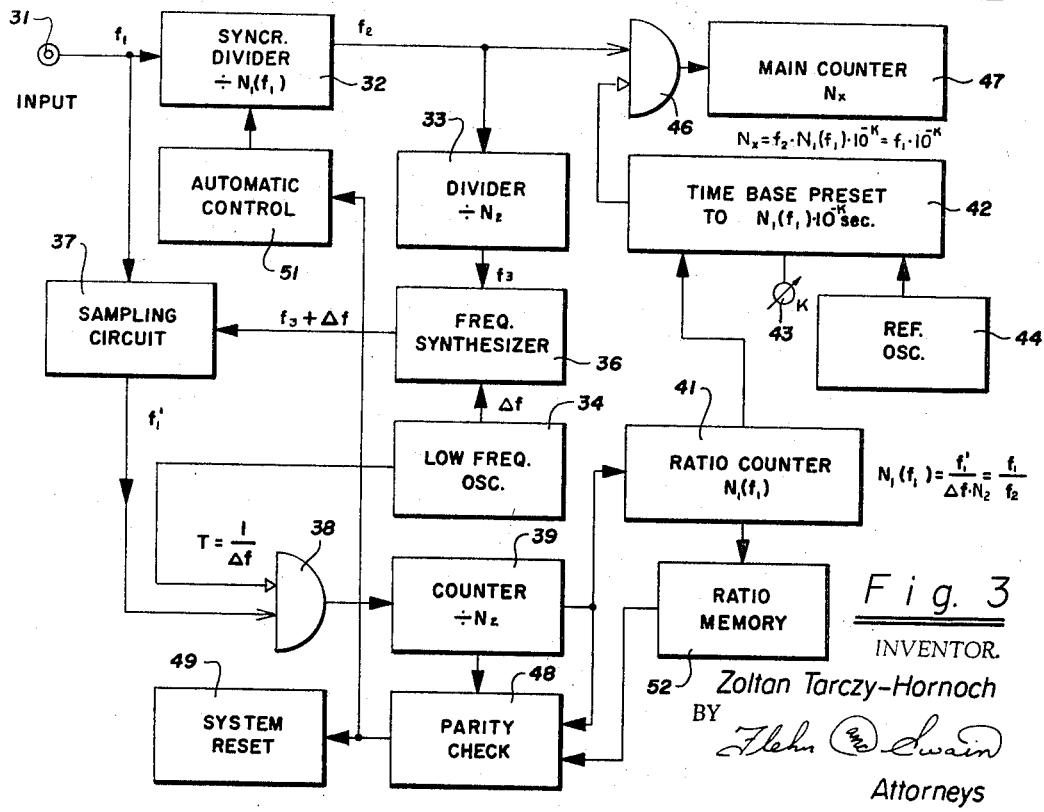
FIGURE 3 is a block diagram of another embodiment of apparatus incorporating the present invention.

Another embodiment of the present invention is shown in block diagram form in FIGURE 3. The unknown input signal with a period of $T_1$ and a frequency of $f_1$ to be measured and identified as $f_1$ is fed to an input terminal 31 and into a synchronous divider 32. The function of the synchronous divider 32 is identical to the synchronous divider 12 in FIGURE 1. It generates a frequency $f_2$ which can be called a repetitive short time base which is related to the frequency $f_1$ to be measured by having its period be a multiple integer $N_1$ times the period of $f_1$. The frequency $f_2$ is fed into an additional divider 33 which can either be of the synchronous or digital type and which divides by a fixed factor of $N_2$. The output of this divider 33 with a frequency of $$f_3 = \frac{f_2}{N_2} = \frac{f_1}{N_1(f_1) \times N_2}$$

together with the output $\Delta f$ from a low frequency oscillator 34 are fed into the frequency synthesizer 36. The synthesizer 36 generates a sine wave with a frequency of $f_3 + \Delta f$. Synthesizers of this type are known and are used in available conventional frequency synthesizing instruments. It should be noted that a frequency synthesizer which would generate a difference frequency $f_3 - \Delta f$ can also be used but not one which would generate both the difference and the sum.

The sum frequency $f_3 + \Delta f$ is fed into the sampling circuit 37 where it generates the sampling pulses to sample the input frequency $f_1$ which is supplied to the sampling circuit 37. This single sampling circuit 37 takes the place of the previous dual channel sampling circuit 16 in FIGURE 1. The sampling circuit 37 similarly converts $f_1$ into $f_1'$ which is much lower in frequency than the original $f_1$. The $f_1'$ waveform is fed into a gate 38 and through the gate into a counter 39.

The gate 38 is controlled by the output from the low frequency oscillator 34 and is turned on for a time period $T = 1/\Delta f$. During this period gate 38 will pass $N_1(f_1) \times N_2$ cycles of $f_1'$. This is divided down by $N_2$ by the digital counter 39. The output of the counter 39 is fed into a ratio counter 41 which measures the remaining factor $N_1(f_1)$ of the full ratio. As it can be easily verified, $N_1(f_1)$ will be equal to $f_1'/N_2 \times \Delta f$ which is the same as $f_1/f_2$, the original ratio of the synchronous divider.

As can be seen the ratio determining apparatus and method in this embodiment is somewhat different than in the embodiment shown in FIGURE 1, because only one sampling circuit is used in place of two sampling circuits. The second sampling circuit would merely convert $f_3$ to $f_3'$ for the purpose of determining $$N_1(f_1) \times N_2 = \frac{f_1'}{f_3'} = \frac{f_1}{f_2}$$

But to sample the frequency $f_3$ at the rate of $f_3 + \Delta f$ would take precisely the time of $T = 1/\Delta f$ before one full period of frequency $f_3'$ would be scanned. Therefore, for the ratio counter 39, it is enough to feed in $\Delta f$ frequency of the low frequency oscillator and $f_1'$ to provide $$N_1(f_1) \times N_2 = \frac{f_1'}{\Delta f}$$

and $$N_1(f_1) = \frac{f_1'}{N_2 \times \Delta f} = \frac{f_1}{f_2}$$

The $N_1(f_1)$ readout of the ratio counter 41 is utilized to preset the time base to $N_1(f_1) \times 10^{-k}$ seconds. As explained previously, the $k$ factor in the embodiment shown in FIGURE 1 was a fixed value and was determined by the frequency of the reference oscillator and the number of decimal counting units preceding the preset decades. In the embodiment shown in FIGURE 3, the factor $k$ is adjustable through integer numbers by a control switch 43 which shifts the number of decimal counting units preceding the preset decades. A reference oscillator 44 supplies the reference frequency for the time base 42.

The output signal $f_2$ of the synchronous divider 32 is fed to a gate 46 which is enabled by the output from the time base 42. The output of the gate 46 is supplied to a main counter 47. Thus, the main counter 47 is counting the number of cycles of the signal of $f_2$ frequency during a time of $N_1(f_1) \times 10^{-k}$ second. Therefore after it is stopped by the gate 46, its reading will be $$N_x = f_2 \times N_1(f_1) \times 10^{-k}$$

Substituting $f_1/N_1(f_1)$ for $f_2$, it is found that $N_x = f_1 \times 10^{-k}$ which is the frequency to be measured except for the decimal factor. The switch 43 can be wired to the main counter so that a lighted decimal point is automatically placed in the proper position depending upon the position of the switch. The only purpose to vary $k$ is to change the length of the measurement thereby permitting higher resolution i.e., more significant digits to be read out. When high resolution is not required, the time base can be shortened and the measurement can be made faster.

It should be noted that divider 33 and counter 39 both with a dividing ratio $N_2$ can be eliminated which means $N_2=1$. However, in such a case, the synchronous divider output frequency fed into the frequency synthesizer is relatively high and therefore necessitates the use of relatively more complex circuitry, both for the frequency synthesizer 36 and the sampling circuit 37.

The use of $N_2$ not equal to 1 has an additional advantage. Since the additional divider 33 divides the output of the synchronous divider by $N_2$, this means that the ratio number which would be measured by the counter 39 and ratio counter 41 would be $N_2$ times larger than the true ratio between $f_1$ and $f_2$. Therefore, it is known that the number supplied to the counter 39 should always be an integer multiple of $N_2$, that is, the counter 39 should always be automatically filled up to its zero or reset state after the full ratio measurement is made.

A parity check circuit 48 is connected to the output of counter 39 and determines whether the counter 39 properly returned to zero at the finish of the ratio counting, and if not, it supplies a signal to system reset 49. The system reset 49 resets all circuitry in the system and causes a new measurement to be made. If that is also reset, the operator will see continuous zeros displayed on the main counter 47 and will know that either the trigger control needs adjustment or that the input signal level or frequency is not within the measuring range of the instrument.

The output of the parity check circuit also can be utilized to eliminate the need for a manual trigger control. In this embodiment an automatic control circuit 51 takes the place of the manual control 23 provided in the embodiment shown in FIGURE 1. Each time that the parity check 48 indicates that the reading was not steady because parity was not preserved, the automatic control circuit 51 is advanced to provide stepwise changing bias for the trigger circuit to provide stepwise changing delay to $T_2$. Although $T_2$ or the bias level can be adjusted in both directions to provide a steadier reading, this is not necessary because ambiguity jittering can occur at only one particular bias point at one particular frequency. Thus, it is enough to adjust the setting of the automatic control 51 in one direction only and after a predetermined number of steps return to a basic position again. With automatic control 51 utilized no human operator is needed and the reading or printout will be always correct as long as an adequate input signal is present. This feature makes the method particularly adaptable for remote control, monitoring or controlling applications.

An additional parity check can be provided in the apparatus. In the embodiment shown in FIGURE 3 this takes the form of having the ratio counter 41 measure the ratio repetitively. The previously measured ratio is memorized in a ratio memory 51 and the parity check circuit 48 compares the previous ratio with the present ratio. If this ratio stays constant and the $N_2$ parity is preserved, the reading can be accepted as correct. If the ratio is changing during a measurement because the signal frequency is changing too much, then the counter must wait until the frequency becomes steady, at least steady enough for the duration of the measurement, and then make new attempts to measure the input frequency. This ratio memory is an additional parity check feature which prevents the instrument from making an incorrect reading. The instrument will either read the correct input frequency or will not read anything at all. The ratio memory, parity check and system reset circuits are conventional in design.

By way of example, an instrument constructed in accordance with the embodiment shown in FIGURE 3 was able to make a measurement of an input frequency of 7.2 gHz.$=7.2\times10^9$ cycles per second. The $T_2$ interval for the instrument was selected so that $N_1$ at 7.2 gHz. equaled 90, and so the frequency from the synchronous divider 32 was 80 mHz. The 80 mHz. was fed into the main counter 47 and the divider 33 divided $f_2$ by a constant factor of 8, thereby providing frequency $f_3=10$ mHz.

The low frequency oscillator was selected to have an output frequency of 1 kHz., so that $T=1$ msec. After sampling the $f_1'$ frequency was such that during this 1 msec. 720 cycles passed through gate 38. Counter 39 divided the output of the gate 38 back down to 90 so that the ratio counter 41 measured 90. This number caused the time base to preset to 90 msec. The main counter 47 measured the frequency $f_2=80$ mHz. for a duration of 90 msec., giving a reading of 7200000. The decimal point was automatically placed to show that frequency measured was 7200.000 mHz. or 7.2 gHz.

It should be evident, that much higher frequencies than given in the above example could also be measured with the method hereinbefore described. It should be noted that the method has no inherent limitations for measuring extremely low frequencies and can be used for this purpose if desired. One particular application of the method hereinbefore described is in controlling or stabilizing microwave oscillators. The desired frequency can be predetermined and set by suitable means such as switch closures, memory elements or preprogramming devices. The actual frequency of the oscillator is then determined utilizing the present invention. A conventional digital comparator circuit determines whether the actual frequency is less or more than the desired frequency. An automatic frequency control feedback circuit can be used to increase or decrease the frequency until a predetermined frequency is obtained.

It is apparent from the foregoing that there has been provided a new and improved apparatus and method for counting high frequencies. The apparatus gives a direct reading which requires no human computation or interpretation. This makes it particularly adapted for use in automatic or remote control operations, or for operation by relatively unskilled personnel. In addition it is particularly adaptable for use for microwave oscillator monitoring, controlling and stabilizing.

I claim:

1. In an apparatus for measuring digitally the frequency of an input signal, input means for receiving the input signal, first means connected to the input means and receiving a portion of the input signal for generating a first signal having a frequency related to the frequency of the input signal so that small changes in the frequency of the input signal cause smaller changes by an integer divisor in the frequency of the first signal, said integer being greater than one, and second means connected to the input means for receiving a portion of the input signal and connected to the first means for receiving a portion of the first signal, said second means generating a substantially uniformly periodic second signal having a frequency representing the actual value of the integer, said frequency of said second signal being lower than and independent of the frequency of the input signal.

2. Apparatus as in claim 1 wherein the second means for generating said second signal includes converter means for providing a periodically changing impedance as seen by the input signal while received by the second means thereby generating said second signal having a frequency lower than the frequency of the input signal, said periodically changing impedance having a frequency of repetition different from the frequency of the first signal.

3. In an apparatus for counting the frequency of an input signal, input means for receiving the input signal, first means connected to the input means for generating a first signal having a frequency lower than the frequency of the input signal in such a manner that small changes in the frequency of the input signal cause smaller corresponding changes in the frequency of the first signal, the ratio of any small change in the frequency of the input signal to the corresponding change of the frequency of the first signal being an integer greater than one, digital counting means connected to the first means for monitoring said ratio between the frequency of the input signal and the frequency of the first signal, and means for multiplying the number representing the frequency of the first signal by said integer to provide a digital substantially direct representation of the frequency of the input signal.

4. In an apparatus for processing a periodic electrical input signal having a characteristic frequency, input means for receiving the input signal, first means having an input terminal and an output terminal, the input terminal of the first means being coupled to the input means and receiving a portion of the input signal therefrom, said first means serving to generate a first signal having a frequency lower than the frequency of the input signal in such a manner that small changes in the frequency of the input signal cause smaller corresponding changes in the frequency of the first signal, the ratio of any small change in the frequency of the input signal to the corresponding change of the frequency of the first signal being an integer greater than one, and second means having two input terminals and output means, the first input terminal of the second means being coupled to the input means and receiving a portion of the input signal therefrom and the second input terminal of the second means being coupled to the output terminal of the first means and receiving a portion of the first signal therefrom, said second means serving to generate and supply to said output means a second signal having a frequency proportional to said integer and independent of small changes in the frequency of the input signal, said second signal being substantially uniformly periodic.

5. In an apparatus for processing a periodic electrical input signal having a characteristic frequency, input means for receiving the input signal, first means having an input terminal and an output terminal, the input terminal of the first means being coupled to the input means and receiving a portion of the input signal therefrom, said first means serving to generate a first signal having a frequency lower than the frequency of the input signal in such manner that small changes in the frequency of the input signal cause smaller corresponding changes in the frequency of the first signal, the ratio of any small change in the frequency of the input signal to the corresponding change of the frequency of the first signal being an integer greater than one, second means having two input terminals and output means, the first input terminal of the second means being coupled to the input means and receiving a portion of the input signal therefrom and the second input terminal of the second means being coupled to the output terminal of the first means and receiving a portion of the first signal therefrom, said second means serving to obtain information about said integer and to supply said information in electrical signal form proportional to said integer to said means, and third means having output means, said third means being coupled to said output means of the second means and receiving said electrical signal therefrom, said third means serving to transform said electrical signal into a digital code representing said integer regardless of any change in the frequency of the first signal and to supply said digital code to the output means of the third means.

6. In an apparatus for processing periodic electrical input signals, each having a characteristic frequency, input means for receiving an input signal, first means having an input terminal and an output terminal, the input terminal of the first means being coupled to the input means and receiving a portion of the input signal therefrom, said first means serving to generate a first signal having a frequency lower than the frequency of the input signal, the frequency of the first signal having a mathematically describable physical relationship to the frequency of the input signal, said first signal being generated in such manner that small changes in the frequency of the input signal cause smaller corresponding changes in the frequency of the first signal, the ratio of any small change in the frequency of the input signal to the corresponding change of the frequency of the first signal being an integer greater than one, and second means having two input terminals and output means, the first input terminal of the second means being coupled to the input means and receiving a portion of the input signal therefrom and the second input terminal of the second means being coupled to the output terminal of the first means and receiving a portion of the first signal therefrom, said second means serving to obtain information about said physical relationship and to supply said information in electrical signal form to said output means, said second means including fourth means coupled to the output terminal of the first means and receiving the first signal therefrom and fifth means coupled to the input means and receiving a portion of the input signal therefrom, said fourth means serving to generate a third signal different from and related to the first signal in such a manner that small changes in the frequency of the first signal cause corresponding small changes in the frequency of the third signal and coupling means for intercoupling said fourth means and fifth means for supplying said third signal to the fifth means, said fifth means serving to generate and supply to said output means of the second means a second signal in response to the input signal and to the third signal in such manner that the frequency of the second signal is independent of small changes in the frequency of the input signal due to compensating changes in the frequency of the third signal, the frequency of said second signal representing uniquely said information about said relationship.

7. In apparatus for processing periodic electrical input signals, each having a characteristic frequency, input means for receiving an input signal, first means including control means, said first means having an input terminal, an output terminal and a control terminal, the input terminal of the first means being coupled to the input means and receiving a portion of the input signal therefrom, said first means serving to generate a first signal having a frequency lower than the frequency of the input signal, the frequency of the first signal normally having a mathematically describable stable physical relationship to the frequency of the input signal, said first signal being generated in such manner that small changes in the frequency of the input signal cause smaller corresponding changes in the frequency of the first signal, the ratio of any small changes in the frequency of the input signal to the corresponding changes in the frequency of the first signal being an integer greater than one, second means having two input terminals and output means, the first input terminal of the second means being coupled to the input means and receiving a portion of the input signal therefrom, the second input terminal of the second means being coupled to the output terminal of the first means and receiving a portion of the first signal therefrom, said second means serving to monitor the stability of said relationship and to generate a control signal if predetermined stability criteria are not met, and means for coupling the output means of the second means to the control terminal of the first means whereby said control signal is supplied to said control terminal, causing said first means to stabilize said physical relationship.

8. In apparatus for digitally measuring the frequency of a high frequency periodic input signal, first means for dividing the frequency of the high frequency input signal by a number to provide a first signal which is lower in frequency than the frequency of the input signal, digital frequency counting means connected to said first means and receiving a portion of the first signal therefrom, second means including additional counting means receiving a portion of the high frequency input signal, and coupling means coupled to said first means and connected to the second means for supplying a second signal from the first means to the second means, said second means also including counting means ensuring that the number used by the first means in dividing the frequency is an integer, said first means being coupled to and receiving a control signal from said second means.

9. In an apparatus for processing a periodic electrical first signal, first means for receiving said first signal, second means having an input terminal, a control terminal, and an output terminal, means coupling the input terminal of the second means to the first means for receiving a portion of the first signal therefrom, said second means generating and supplying to said output terminal of said second means a second signal having frequency lower than the frequency of the first signal and a frequency which is normally related by a stable subharmonic relationship to the frequency of the first signal, third means having two input terminals and an output terminal, the first input terminal of the third means being coupled to the first means for receiving a portion of the first signal therefrom, the second input terminal of the third means being coupled to the output terminal of the second means for receiving a portion of the second signal therefrom, said third means serving to monitor the stability of said subharmonic relationship and serving to generate and supply to said output terminal of the third means an error signal in response to a deviation from said subharmonic relationship, and means coupling said output terminal of the third means to the control terminal of the second means and supplying said error signal thereto, said error signal causing the second means to re-establish a stable subharmonic relationship between the frequency of the first signal and the frequency of the second signal.

10. Apparatus as in claim 9 wherein said third means includes digital counting means for digitally monitoring the stability of said subharmonic relationships.

11. In an apparatus for processing a periodic electrical input signal having a characteristic frequency, input means for receiving the input signal, first means having an input terminal, a control terminal and an output terminal, the input terminal of the first means being coupled to the input means for receiving a portion of the input signal therefrom, said first means serving to generate a first signal having a frequency lower than the frequency of the input signal, the frequency of the first signal normally having a mathematically describable stable physical relationship to the frequency of the input signal, said first signal being generated in such manner that small changes in the frequency of the input signal cause smaller corresponding changes in the frequency of the first signal, the ratio of any small change in the frequency of the input signal to the corresponding change of the frequency of the first signal being an integer greater than one, second means having first and second input terminals and an output terminal, the first input terminal of the second means being coupled to the input means and receiving a portion of the input signal therefrom, coupling means coupled to the first means and connected to the second input terminal of the second means for supplying a second signal from said first means to said second means thereby enabling said second means to monitor the stability of said relationship, said second means serving to generate and supply to said output terminal of the second means an error signal in response to the detected deviation from said relationship, and additional coupling means coupling said output terminal of the second means to the control terminal of the first means and supplying said error signal thereto, said error signal causing the first means to re-establish a stable relationship between the frequency of the input signal and the frequency of the first signal.

12. Apparatus as in claim 11 wherein said second means includes digital counting means having input and output terminals, said counting means serving to monitor digitally the stability of said relationship.

13. Apparatus as in claim 12 wherein said second means includes frequency reducing means having input and output terminals, the input terminal of said frequency reducing means being coupled to the input means for receiving a portion of the input signal therefrom, the output terminal of the frequency reducing means being coupled to said input terminal of said counting means for supplying a reduced frequency signal to be counted thereto.

14. Apparatus as in claim 13 together with digital frequency counting means having an input terminal and readout means, the input terminal of said frequency counting means being coupled to the output means of the first means for receiving a portion of the first signal therefrom, said frequency counting means serving to count the cycles of said first signal, and additional means causing said frequency counting means to read out by said readout means a substantially direct digital representation of the frequency of the input signal.

15. In a method for processing periodic electrical input signals, each having a characteristic frequency, the step of receiving an input signal, the step of generating a first signal having a frequency lower than the frequency of the input signal, the frequency of the first signal normally having a mathematically describable stable physical relationship to the frequency of the input signal, said first signal being generated in such manner that small changes in the frequency of the input signal cause smaller corresponding changes in the frequency of the first signal, the ratio of any small change in the frequency of the input signal to the corresponding change in the frequency of the first signal being an integer greater than one, the step of digitally monitoring the stability of said relationship, said last named step including the step of counting, the step of generating an error signal in response to a detected deviation from said relationship between the input signal and the first signal, and the step of re-establishing a stable relationship between the frequency of the input signal and the frequency of the first signal in response to said error signal.

16. A method as in claim 15 together with the step of digital counting the frequency of the first signal and modifying the frequency count according to said mathematically describable relationship to provide a number representing directly the frequency of the input signal.

17. In a method for digitally counting the frequency of an input signal, the step of generating a signal having a frequency having a relationship to the frequency of the input signal, said signal being generated in such manner that small changes in the frequency of the input signal cause smaller corresponding changes in the frequency of the generated signal, the step of automatically obtaining information by digital counting concerning the frequency relationship between the frequency of the input signal and the frequency of the generated signal, and the step of digitally counting the frequency of the generated signal, said last named step including the step of multiplying the number representing the frequency of the generated signal in accordance with said relationship to provide a number representing the frequency of the input signal.

18. In a method for processing periodic electrical input signals, each having a characteristic frequency, receiving an input signal, generating a first signal having a frequency lower than the frequency of the input signal in such manner that small changes in the frequency of the input signal cause smaller corresponding changes in the frequency of the first signal, the ratio of any small change in the frequency of the input signal to the corresponding change of the frequency of the first signal being an integer greater than one, generating a second signal having a frequency which is an arithmetic combination of the frequency of the first signal and a predetermined frequency, converting a portion of the input signal into a third signal by feeding the input signal into a periodically changing impedance, the period of the impedance change being controlled by the frequency of the second signal, said third signal being generated in such a manner that frequency of the third signal is independent of small variations in the frequency of the input signal, and processing said third signal to obtain coded digital information representing uniquely said integer, said step of processing including a step of digital counting.

19. In apparatus for measuring digitally the frequency of an input signal, input means for receiving the input signal, first means connected to the input means and receiving a portion of the input signal for generating a first signal having a frequency related to the frequency of the input signal, said first signal being generated in such manner that small changes in the frequency of the input signal cause smaller changes by an integer divisor in the frequency of the first signal, said integer divisor being greater than one, second means connected to the input means for receiving a portion of the input signal and connected to the first means for receiving a portion of the first signal, said second means generating a second signal having a frequency proportional to the actual value of the integer divisor, said frequency of said second signal being lower than and independent of the frequency of the input signal, and additional counting means for counting the cycles of the first signal for a time interval proportional to said integer to accumulate a count representing essentially the frequency of the input signal.

20. In apparatus for measuring digitally the frequency of an input signal, input means for receiving the input signal, first means connected to the input means and receiving a portion of the input signal for generating a first signal having a frequency related to the frequency of the input signal in such manner that small changes in the frequency of the input signal cause smaller changes by an integer divisor in the frequency of the first signal, said integer divisor being greater than one, second means connected to the input means for receiving a portion of the input signal and connected to the first means for receiving a portion of the first signal, said second means generating a second signal having a frequency representing the actual value of the integer divisor, said frequency of said second signal being lower than and independent of the frequency of the input signal, said second means for generating said second signal including converter means for providing a periodically changing impedence as seen by the input signal while received by the second means thereby generating said second signal having a frequency lower than the frequency of the input signal, means for producing a signal having a predetermined frequency, frequency synthesizing means for generating a third signal having a frequency which is a combination of the predetermined frequency and the frequency of the first signal and means for supplying said third signal to said converter means to cause said converter means to provide said periodically changing impedance.

21. Apparatus as in claim 20 wherein frequency synthesizer means includes means for dividing the frequency of the first signal by a predetermined number whereby said third signal generated by said frequency synthesizing means has a frequency which is a combination of the predetermined frequency, the predetermined number and the frequency of the first signal.

22. In apparatus for measuring digitally the frequency of an input signal, input means for receiving the input signal, first means connected to the input means and receiving a portion of the input signal for generating a first signal having a frequency related to the frequency of the input signal, said first signal being generated in such manner that small changes in the frequency of the input signal cause smaller changes by an integer divisor in the frequency of the first signal, said integer divisor being greater than one, second means connected to the input means for receiving a portion of the input signal and connected to the first means for receiving a portion of the first signal, said second means generating a second signal having a frequency representing the actual value of the integer divisor, said frequency of said second signal being lower than and independent of the frequency of the input signal, and means for generating a control signal in response to a change in the integer divisor.

23. Apparatus as in claim 22 together with means for resetting the apparatus and causing it to make a new measurement in response to said control signal.

24. In apparatus for digitally counting the frequency of an input signal during a measurement cycle, an input terminal for receiving the input signal, means connected to the input terminal for providing a generated signal having a subharmonic frequency relationship to the frequency of the input signal, means including digital counting means for automatically obtaining information about the frequency relationship between the input signal and the generated signal, said means for automatically obtaining information about the subharmonic frequency relationship including means for generating an additional signal having a frequency representing the ratio between the frequency of the input signal and the frequency of the generated signal, means for digitally counting the frequency of the generated signal and means for multiplying the number representing the frequency of the generated signal by said integer to provide a number representing the frequency of the input signal.

25. Apparatus as in claim 24 wherein the means for generating said additional signal includes sampling means for perodically sampling the amplitude of the input signal.

26. In a apparatus for processing periodic electrical input signals, each having a characteristic frequency, input means for receiving an input signal, first means having an input terminal and an output terminal, the input terminal of the first means being coupled to the input means and receiving a portion of the input signal therefrom, said first means serving to generate a first signal having a frequency lower than the frequency of the input signal, the frequency of the first signal having a mathematically describable physical relationship to the frequency of the input signal, said first signal being generated in such manner that small changes in the frequency of the input signal cause smaller corresponding changes in the frequency of the first signal, the ratio of any small changes in the frequency of the input signal to the corresponding changes of the frequency of the first signal being an integer greater than one, second means having two input terminals and output means, the first input terminal of the second means being coupled to the input means and receiving a portion of the input signal therefrom and the second input terminal of the second means being coupled to the output terminal of the first means and receiving a portion of the first signal therefrom, said second means serving to generate and supply to said output means a second signal having a frequency representative of said integer, and third means having output means, said third means being coupled to said output means of the second means and receiving said second signal therefrom, said third means serving to transform said second signal into coded digital information representing said integer and to supply said coded digital informaton to the output means of the third means.

27. In an apparatus for processing periodic electrical input signals, each having a characteristic frequency, input means for receiving an input signal, first means having an input terminal and an output terminal, the input terminal of the first means being coupled to the input means and receiving a portion of the input signal therefrom, said first means serving to generate a first signal having a frequency lower than the frequency of the input signal, the frequency of the first signal having a mathematically describable physical relationship to the frequency of the input signal, said first signal being generated in such manner that small changes in the frequency of the input signal cause small corresponding changes in the frequency of the first signal, the ratio of any small change in the frequency of the input signal to the corresponding change of the frequency of the first signal being an integer greater than one, second means having two input terminals and output means, the first input terminal of the second means being coupled to the input means and receiving a portion of the input signal therefrom and the second input terminal of the second means being coupled to the output terminal of the first means and receiving a portion of the first signal therefrom, said second means serving to generate and supply to said output means a second signal having a frequency representative of said integer, said second means including a fourth means coupled to the output terminal of the first means and receiving the first signal therefrom, fifth means coupled to the input means and receiving a portion of the input signal therefrom, said fourth means serving to generate a third signal different from and related to the first signal in such a manner that small changes in the frequency of the first signal cause corresponding small changes in the frequency of the third signal, and coupling means for coupling said fourth means and fifth means for supplying said third signal to the fifth means, said fifth means serving to generate and supply to said output means of the second means said second signal in response to the input signal and to the third signal in such a manner that the frequency of the second signal is independent of small changes in the frequency of the input signal due to compensating changes in the frequency of the third signal, the frequency of said second signal representing uniquely said relationship.

28. Apparatus as in claim 27 together with third means coupled to the output means of the second means and receiving said second signal therefrom for generating a control signal in response to a change of said relationship.

29. Apparatus as in claim 27 together with third means having output means, third means being coupled to said output means of the second means and receiving said second signal therefrom, the third means serving to transform said second signal into coded digital information representing said integer and to supply said coded digital information to the output means of the third means.

30. Apparatus as in claim 27 wherein said fifth means consists of converter means for providing a periodically changing impedance for the input signal as received by the fifth means, together with a signal source providing a fourth signal and wherein said fourth means consists of frequency synthesizing means connected to said signal source and receiving the fourth signal therefrom, said frequency synthesizing means serving to generate said third signal having a frequency which is a combination of the frequency of the first signal and the frequency of the fourth signal and to supply the third signal to said fifth means to cause said converter means to provide said periodically changing impedance at a frequency determined by the frequency of said third signal.

31. Apparatus as in claim 30 wherein said frequency synthetizing means includes dividing means for dividing the frequency of the first signal by a predetermined number to provide a signal with a divided-down frequency whereby the third signal from the synthesizing means has a frequency which is a combination of the frequency of the fourth signal, the frequency of the first signal and the predetermined number.

32. Apparatus as in claim 30 wherein a change in said relationship causes a change in the frequency of the second signal together with third means coupled to the output means of the second means and receiving the second signal therefrom for generating a control signal in response to a change in the frequency of the second signal.

33. Apparatus as in claim 30 together with third means having output means, said third means being coupled to the output means of the second means and receiving said second signal therefrom, said third means serving to process said second signal and to supply a number representing said integer in a digitally coded signal form to said output means of the third means.

34. Apparatus for frequency counting as in claim 30 together with counting means, gating means connected to said output terminal of first means and to the counting means, and time base means connected to the gating means, the time base means serving to provide an enabling signal for the gating means, the enabling signal having a duration which is said integer times a predetermined unit of time, the gating means while enabled serving to feed said first signal from the output terminal of the first means to said counting means, the counting means serving to count the number of cycles of the first signal for the duration of said enabling signal thereby accumulating a count which is substantially a numerical representation of the frequency of the input signal.

35. Apparatus for frequency counting as in claim 33 together with counting means, gating means connected to said output terminal of the first means and to the counting means, and time base means connected to the gating means and to said output means of the third means, the time base means serving to provide an enabling signal for the gating means, the enabling signal having a duration determined by said third means, the duration being said integer times a predetermined unit of time, the gating means while enabled serving to feed said first signal from the output terminal of the first means to said counting means, the counting means serving to count the number of cycles of the first signal for the duration of said enabling signal thereby accumulating a count which is substantially a numerical representation of the frequency of the input signal.

36. Apparatus as in claim 35 wherein said fifth means consists of sampling means for periodically sampling the amplitude of the received portion of the input signal and wherein the sampling rate is determined by the frequency of the third signal.

37. Apparatus as in claim 36 wherein said third means includes a ratio counter counting the ratio of the frequency of said second signal and the frequency of said fourth signal to obtain a count representing said integer.

38. Apparatus as in claim 37 wherein said time base means consists of a presettable time base, said ratio counter causing said time base to be preset to said integer times a predetermined unit of time.

39. In an apparatus for processing periodic electrical input signals, each having a characteristic frequency, input means for receiving an input signal, first means having an input terminal and an output terminal, the input terminal of the first means being coupled to the input means and receiving a portion of the input signal therefrom, said first means serving to generate a first signal having a frequency lower than the frequency of the input signal in such manner that small changes in the frequency of the input signal cause smaller corresponding changes in the frequency of the first signal, the ratio of any small change in the frequency of the input signal to the corresponding change of the frequency of the first signal being an integer greater than one, second means having two input terminals and output means, the first input terminal of the second means being coupled to the input means and receiving a portion of the input signal therefrom and the second input terminal of the second means being coupled to the output terminal of the first means and receiving a portion of the first signal therefrom, said second means serving to generate and supply to said output means a second signal having a frequency representative of said integer, said second means including fourth means coupled to the output terminal of the first means and receiving the first signal therefrom, fifth means coupled to the input means and receiving a portion of the input signal therefrom, said fourth means serving to generate a third signal different from and related to the first signal in such a manner that small changes in the frequency of the third signal, coupling means for intercoupling said fourth means and fifth means for supplying said third signal to the fifth means, said fifth means serving to generate and supply to said output means of the second means said second signal in response to the input signal and to the third signal in such manner that the frequency of the second signal is independent of small changes in the frequency of the input signal due to compensating changes in the frequency of the third signal, the frequency of said second signal representing uniquely said relationship, said fifth means consisting of converter means for providing a periodically changing impedance for the input signal as received by the fifth means, a signal source providing a fourth signal, said fourth means consisting of frequency synthesizing means connected to said signal source and receiving the fourth signal therefrom, said frequency synthesizing means serving to generate said third signal having a frequency which is a combination of the frequency of the first signal and the frequency of the fourth signal and to supply the third signal to said fifth means to cause said converter means to provide said periodically changing impedance at a frequency determined by the frequency of said third signal, third means having output means, said third means being coupled to the output means of the second means and receiving said second signal and to supply a number representing said integer in a digitally coded signal form to said output means of the third means, counting means, gating means connected to said output terminal of the first means and to the counting means, time base means connected to the gating means and to said output means of the third means, the time base means serving to provide an enabling signal for the gating means, the enabling signal having a duration determined by said third means, the duration being said integer times a predetermined unit of time, the gating means while enabled serving to feed said first signal from the output terminal of the first means to said counting means, the counting means serving to count the number of cycles of the first signal for the duration of said enabling signal thereby accumulating a count which is substantially a numerical representation of the frequency of the input signal, said third means including means for monitoring the repeatability of said number representing said integer, means for comparing the monitored repeatability with the predetermined repeatability criteria and means for indicating the non-repeatability if the repeatability criteria are not met.

40. Apparatus as in claim 39 together with means for rejecting the accumulated count and causing a new count to be accumulated if the repeatability criteria are not met.

41. In a counting apparatus, digital counting means having readout means for counting the cycles of a substantially uniformly periodic input signal during an interval of time thereby accumulating a count representing a digital number, means for monitoring the consistency of the digital number, means for comparing the monitored consistency with predetermined consistency criteria and means for preventing readout by said readout means of said digital number if the consistency criteria are not met.

42. In an apparatus for making repetitive digital measurements on a physical quantity, quantizing means for obtaining a first digital number related to the sampled magnitude of the physical quantity at the time of a first sampling, memory means coupled by coupling means to said quantizing means for memorizing said first digital number, means coupled to said quantizing means for enabling said quantizing means to obtain a second digital number related to the sampled magnitude of the physical quantity at the time of a second sampling after said first digital number has been memorized in said memory means, checking means coupled to said quantizing means and coupled to said memory means for comparing said second digital number with said first digital number, said checking means including means for generating an error signal in response to a difference between said first digital number and said second digital number exceeding predetermined tolerance limits, and means for indicating that the measurement may be in error and causing a new pair of first and second digital numbers to be obtained in response to said error signal.

43. Apparatus as in claim 42 wherein said quantizing means consists of a digital counter counting the cycles of a substantially uniformly periodic electrical input signal during an interval of time determined by a second signal.

References Cited
UNITED STATES PATENTS

| | | | |
|---|---|---|---|
| 3,293,559 | 12/1966 | Howard et al. | 331—2 |
| 2,235,755 | 3/1941 | Bakker et al. | |
| 2,851,596 | 9/1958 | Hilton. | |
| 2,951,986 | 9/1960 | Gordon. | |
| 3,039,685 | 6/1962 | Bagley et al. | |
| 3,071,725 | 1/1963 | McWaid. | |
| 3,150,350 | 9/1964 | Goldman. | |
| 3,213,361 | 10/1965 | Dornberger et al. | |
| 3,229,203 | 1/1966 | Minohara. | |
| 3,242,461 | 3/1966 | Silberg et al. | |

FOREIGN PATENTS 749,060  5/1956  Great Britain.

RUDOLPH V. ROLINEC, Primary Examiner.

P. F. WILLE, Assistant Examiner.

U.S. Cl. X.R.

328—133

UNITED STATES PATENT OFFICE
CERTIFICATE OF CORRECTION

Patent No. 3,450,991                      June 17, 1969

Zoltan Tarczy-Hornoch

It is certified that error appears in the above identified patent and that said Letters Patent are hereby corrected as shown below:

Column 14, line 67, after "of" insert -- the first signal cause corresponding small changes in the frequency of --.

Signed and sealed this 21st day of April 1970.

(SEAL)
Attest:

Edward M. Fletcher, Jr.                      WILLIAM E. SCHUYLER, JR.
Attesting Officer                                Commissioner of Patents